United States Patent [19]

Anderson

[11] Patent Number: 4,693,500
[45] Date of Patent: Sep. 15, 1987

[54] SWIVEL JOINT

[76] Inventor: David Anderson, P.O. Box 550, Sand Springs, Okla. 74063

[21] Appl. No.: 908,965

[22] Filed: Sep. 17, 1986

Related U.S. Application Data

[63] Continuation of Ser. No. 742,405, Jun. 7, 1985, abandoned.

[51] Int. Cl.⁴ ............................................. F16L 27/08
[52] U.S. Cl. ....................................... 285/94; 285/96; 285/276; 285/351
[58] Field of Search ................... 285/94, 276, DIG. 1, 285/351, 96, 106, 95

[56] References Cited

U.S. PATENT DOCUMENTS

| | | | |
|---|---|---|---|
| 2,253,932 | 8/1941 | Gilkerson | 285/94 |
| 2,319,543 | 5/1943 | Hall | 285/96 X |
| 2,330,197 | 9/1943 | Allen et al. | 285/94 X |
| 2,444,868 | 7/1948 | Allen et al. | 285/276 X |
| 2,466,025 | 4/1949 | Hanson | 285/94 X |
| 2,514,417 | 7/1950 | Roofe | 285/94 X |
| 2,770,475 | 11/1956 | Rafferty | 285/94 |
| 2,810,592 | 10/1957 | Williams | 285/351 X |
| 3,264,006 | 8/1966 | Downs | 285/94 X |
| 3,600,010 | 8/1971 | Downs et al. | 285/351 X |
| 3,694,008 | 9/1972 | Slator et al. | 285/94 |
| 4,478,438 | 10/1984 | Elorriaga, Jr. | 285/94 X |
| 4,479,669 | 10/1984 | Hynes | 285/351 X |
| 4,561,679 | 12/1985 | Choate | 285/106 X |

FOREIGN PATENT DOCUMENTS 2001231 7/1971 Fed. Rep. of Germany ...... 285/276

Primary Examiner—Thomas F. Callaghan
Attorney, Agent, or Firm—Head, Johnson, Stevenson

[57] ABSTRACT

This is a novel swivel joint for connecting two fluid conveying conduits. It includes an inner cylinder connected to one conduit and an outer cylinder connected to the other conduit. There is a double seal with a pressure chamber therebetween the two cylinders at one end thereof and a second double seal with pressure chamber therebetween at the other end. Four sets of bearing means are located between the inner and outer cylinders between the two double seals.

4 Claims, 3 Drawing Figures

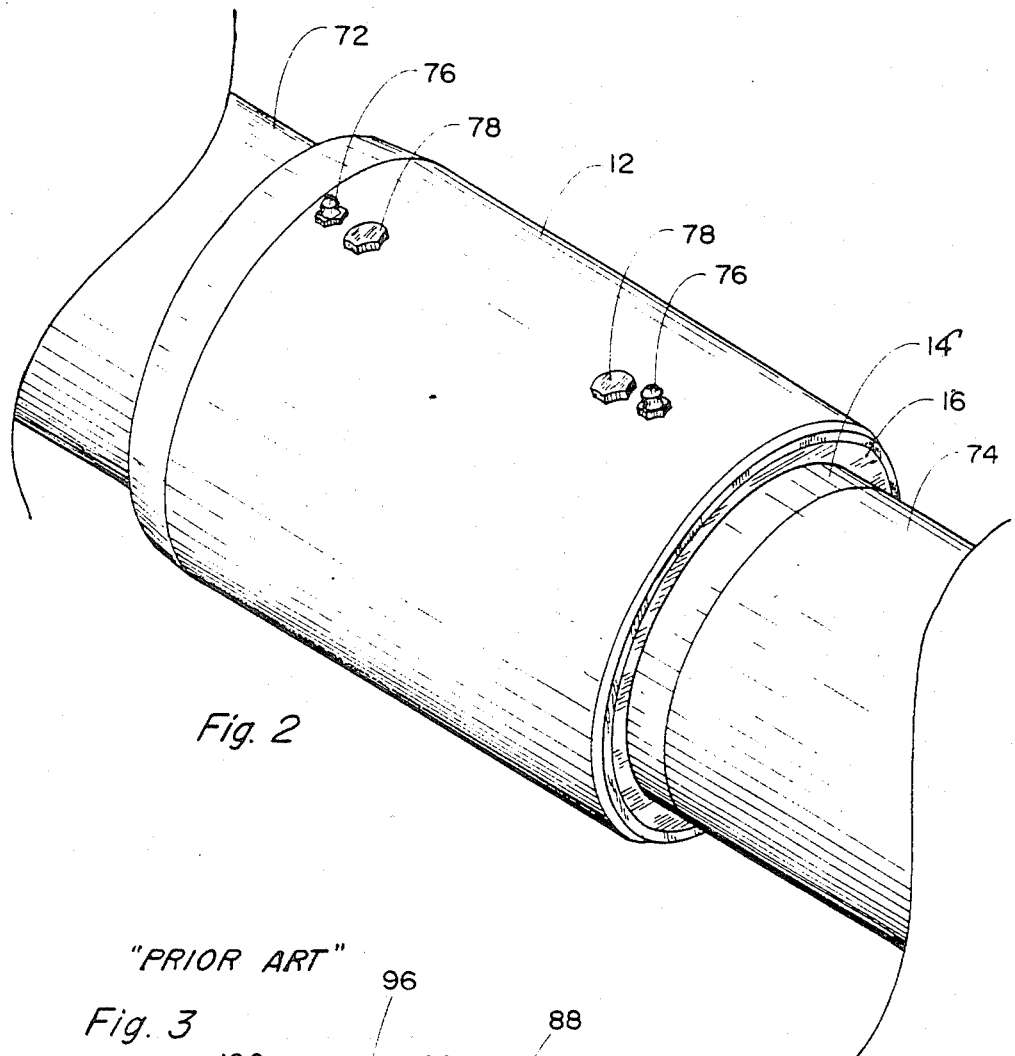
Fig. 2
"PRIOR ART"
Fig. 3
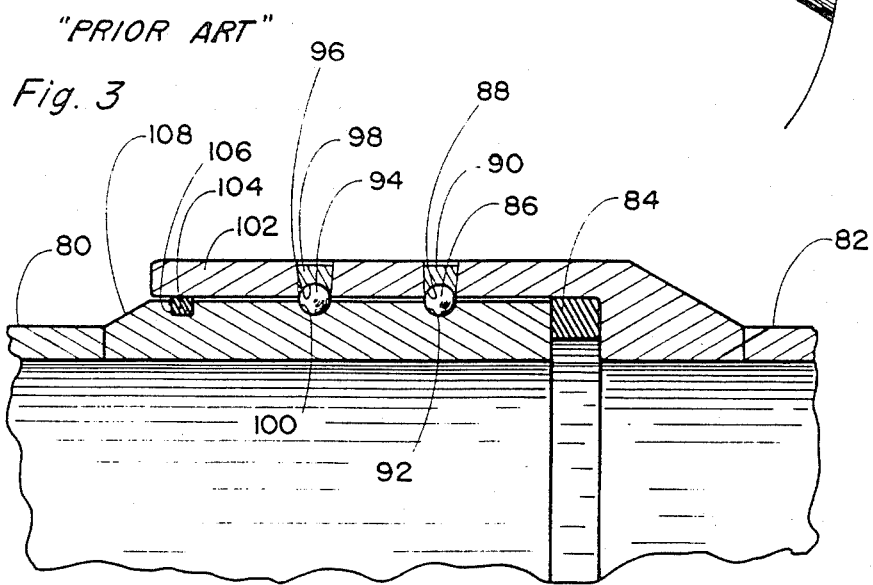

4,693,500

SWIVEL JOINT

CROSS REFERENCE TO RELATED APPLICATIONS

This application is a continuation of Ser. No. 742,405, filed June 7, 1985, and now abandoned.

BACKGROUND OF THE INVENTION

1. Field of the Invention

This invention relates to swivel joints for connecting two fluid carrying conduits or pipes. It relates especially to a new swivel joint which has an improved life length over the prior swivel joints.

2. Prior Art

Swivel joints are currently commercially available for purchase and connects two fluid carrying conduits together. These swivel joints generally contain an inner cylinder, an outer cylinder fitting thereover, seals and ball bearings. Seals are provided between the two cylinders to prevent leakage and ball bearings are provided to permit rotational movement but prohibit longitudinal movements between the two cylinders.

SUMMARY OF THE INVENTION

This is a novel swivel joint for connecting two fluid carrying conduits. It includes an outer cylinder connectible to one of the conduits and an inner cylinder connectible to the other conduit. Between the inner and outer cylinder near the end of the outer cylinder, is a first double seal with a pressure chamber therebetween. There is a second double seal with a pressure chamber therebetween near the other end of the outer cylinder. Between the double seals there are bearing means. Mating races are provided in the inner side of the outer cylinder and the outer side of the inner cylinder and are filled with ball bearings. A dust seal is also provided at the outer end of the outer cylinder to seal with the outer wall of the inner cylinder to help prevent any contaminated fluids from contacting the main seals. The pressure chamber between these two seals, which may be O-rings, is provided with a fluid under pressure. Then when pressure is applied to the first seal of the set, pressure is transmitted through the fluid in the pressure chamber to the second seal. Thus, the first seal does not have as large a pressure drop across it as it would have if the pressure chamber in the second seal were not there.

It is therefore an object of this invention to provide a novel swivel joint for connecting two fluid carrying conduits.

A better understanding of the invention may be had from the following description taken in conjunction with the drawings.

BRIEF DESCRIPTION OF THE DRAWINGS

FIG. 2 is a full face view showing my swivel joint connecting two conduits.

FIG. 3 is a partial cross-section view of the prior art swivel joint.

DETAILED DESCRIPTION OF THE INVENTION

Figure 1:
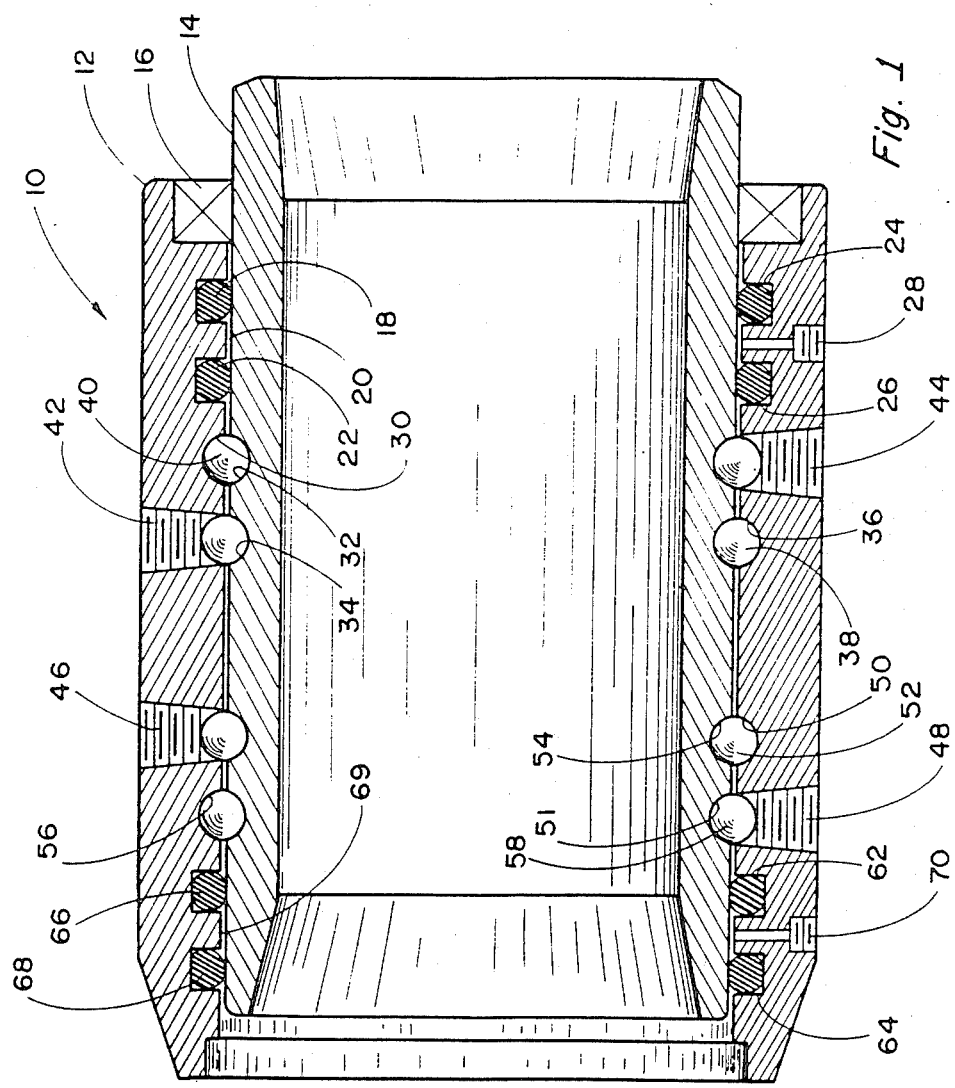
FIG. 1 is a cross-sectional view of my swivel joint.

Attention is first directed briefly to FIG. 3 which shows a prior art swivel joint. Shown thereon is a first conduit 80 which is to be connected to a second conduit 82. An outer cylinder 102 of a swivel joint is fitted over the inner cylinder 108. An outer seal 104 is provided in sealing groove 106 to seal the annulus between the inner cylinder 108 and the outer cylinder 102. A second seal 84 is provided between the end of inner cylinder 108 and a shoulder on the outer cylinder 102. Between seals 104 and 84 there is provided two sets of bearings. One set of ball bearings include ball bearing 86 which is provided in a race which includes a groove 92 in the outer wall of inner cylinder 108 and a second complimentary race or groove 88 in the inner wall of outer cylinder 102. Plug means 90 fills the hole through which the balls are fed. There is a second set of ball bearings 94 which is spaced from the first set and includes a race 100 in the outer wall of the inner cylinder 108 and a second race 96 in the inner wall of outer cylinder 102. Plug means 98 are provided to close the hole in which the balls 94 are provided to the race thus formed. This swivel joint, when new, does provide a swivel joint with a seal. However, its working life is considered too short by most users. Thus, there is a need for a novel type swivel joint having a much greater working life. My present invention provides such a swivel joint.

Attention is next directed to FIG. 1 which shows a cross-sectional view of my swivel joint. Shown thereon is a swivel joint generally designated 10 which has an outer cylinder 12 connectible to one conduit such as 72 shown in FIG. 2 and an inner conduit 14 connectible to a second conduit 74 also shown in FIG. 2. There is a first double seal with pressure chamber therebetween between the outer wall of the inner cylinder 14 near the inner end thereof and the inner wall of cylinder 12 near the outer end thereof. The righthand end of the outer cylinder 12 in FIG. 1 may be called the outer end of the cylinder 12 because it is not to be connected to the conduit 72. The end connected to conduit may be called the inner end. This includes seal receiving grooves 62 and 64 in which are mounted respectively seals 66 and 68 which preferably are O-rings. There is a pressurized chamber 69 between seals 66 and 68. After the swivel joint has been assembled to the point shown in FIG. 1, pressurized fluid such as grease is applied through insert means 70. This insert means 70 can be a zert such as indicated at 76 in FIG. 2. Any suitable type valving arrangements which permits fluid to be injected under pressure and held and maintained therein may be used. A second set of double seals with pressure chamber therebetween is also provided between the inner cylinder 14 and the outer cylinder 12 near the outer end of the outer cylinder 12. This includes two seal receiving grooves 24 and 26 with seals 18 and 22 therein. This second set of double seals can be identical to the first set. Seals 18 and 22 preferably O-rings. There is a pressure chamber 20 between the seals 18 and 22 and means 28 for providing fluid under pressure to such a chamber. A seal 16 is provided at the extreme outer end of outer cylinder 12 between that cylinder and the inner cylinder 14. The main function is to prevent fluid that is external of the conduits from direct contact with the seal 18. It is known that sometimes the swivel joint and conduits will be in an enviornment which could severely damage the seals 18. Thus, seal 16 would have to be destroyed before the damaging factors of the environment could do damage to the seals 18 and 22.

In addition to seals, swivel joints also have means which permit the one cylinder to rotate with respect to the other but to prevent the longitudinal movement therebetween. We will now discuss such means. This includes four sets of ball bearings 40, 38, 52 and 58. Ball bearings 40 are placed in a race formed by inner groove 30 in the inner wall of cylinder 12 and a race 32 in the outer wall of the cylinder 14. A plug 78 as shown in FIG. 2 fills the hole 44 through which the balls are inserted after the cylinder 14 is inserted in the outer cylinder 12 as shown. There are three other sets of bearings. This includes ball bearings 38 which has race 36 in outer cylinder 12 and inner race 34 in inner wall 14, and also has a plug 78 for filling the hole 42 through which balls 38 are added. Balls 52 are added through a hole 46 closed by plug means 78 into a race which includes a groove 50 in cylinder 12 and a groove 54 in the outer wall of inner cylinder 14. Ball bearings 58 are added through a hole 48 closed by closure means 78 and into a race provided by groove 56 in outer cylinder 12 and a race 51 provided in the outer wall of inner cylinder 14. It will be noted that my swivel joint has five sealing surfaces.

The swivel joint which I have shown can be easily constructed and assembled. The inner cylinder 14 and the outer cylinder 12 are machined to have the races and grooves indicated. These are case hardened cylinders. Seals 18, 22, 66 and 68 are placed in their respective positions in races of cylinder 12 as shown. The inner cylinder 14 is then inserted into outer cylinder 12 to the position shown therein in FIG. 1. Next, the ball bearings are inserted through the holes 44, 42, 46 and 48 with proper lubrication. Once the ball bearings are inserted, the holes are filled such as by putting in plugs 78 shown in FIG. 2. I then insert dust seal 16. The swivel joint is now assembled except for pressurizing the pressure chambers 20 and 69. I can do this by inserting a grease through zerts 76 as shown in FIG. 2 until the grease in the pressure chambers are the required pressure. If a swivel joint is designed for 150 pounds of pressure, this pressure in the pressure chamber could typically be about 50 PSI. Although I am not limiting my invention to any particular pressure. Now the swivel joint is ready to connect the two conduits 72 and 74 as indicated in FIG. 2. Any acceptable means of connecting the outer cylinder 12 to conduit 72 and inner cylinder 14 to conduit 74 may be used. It is seen that my main seals are protected from the environment outside the conduits by seal 16. This increases the life of the main seals. Pressurized chamber 69 is also important. Because the fluid in this chamber is pressurized, then the pressure which seal 68 has to withstand is less than it would be without this. Because of the pressure in chamber 69 a part of the pressure applied against seal 68 is also applied against 66. Thus, the drop in pressure or the pressure differential across cross-seal 68 is less than it would be without the pressure chamber 69. This greatly increases the life and efficiency of my seals. My second set of O-rings 18 and 22 are also provided with the pressurized chamber 22 so that it too is a preloaded seal. With this sealing arrangement, my bearings are given additional protection.

While this invention has been described with a certain degree of particularity, it is manifest than many changes may be made in the details of construction in the arrangement of components without departing from the spirit and scope of the disclosure. It is understood that the invention is not limited to the embodiment set forth herein for purposes of exemlification, but is limited only by the scope of the attached claim or claims, including the full range of equivalency to which each element thereof is entitled.

What is claimed:

1. A swivel joint for connecting two fluids carrying conduits comprising:
    an inner conduit section for connecting to a first conduit;
    an outer conduit section adapted to fit over said inner conduit section for connecting to a second conduit, said outer conduit section having an inner end;
    said outer conduit section having a first internal circumferential groove near its inner end and a second internal circumferential groove spaced from said first groove;
    a first O-ring seal in said first internal circumferential groove;
    a second O-ring seal within said second internal circumferential groove;
    a pressure chamber in the annulus between said inner conduit section and said outer conduit section between said first internal circumferential groove and said second internal circumferential groove;
    a grease confined in said pressure chamber under pressure without dependency on pressure of fluid within said inner conduit section;
    bearing means between said inner conduit and said outer conduit section at a location exterior of the space between said first and second O-ring.

2. A swivel joint as defined in claim 1 including a dust seal between the inner conduit section and the outer conduit section at the extreme outer end of said outer conduit section.

3. A swivel joint for connecting two fluids carrying conduits comprising:
    an inner conduit section for connecting to a first conduit;
    an outer conduit section adapted to fit over said inner conduit section for connecting to a second conduit, said outer conduit section having an inner end and an outer end;
    said outer conduit section having a first pair of grooves including a first internal circumferential groove and a second internal circumferential groove spaced from said first groove near its inner end, and a second pair of grooves including a third internal circumferential groove near its outer end and a fourth internal circumferential groove spaced from said third groove;
    a first O-ring seal in said first internal circumferential grooves;
    a second O-ring within said second internal circumferential groove;
    a third O-ring seal in said third internal circumferential groove;
    a fourth O-ring within said fourth internal circumferential groove;
    a first pressure chamber in the annulus between said inner conduit sections and outer conduit sections between said first internal circumferential groove and said second internal circumferential groove;
    a second pressure chamber in the annulus between said inner conduit section and said outer conduit section between said third internal circumferential groove and said fourth internal circumferential groove;
    a first body of grease confined in said first pressure chamber under pressure without dependency on pressure of fluid within said inner conduit section;

a second body of grease confined in said second pressure chamber under pressure without dependency on pressure of fluid within said inner conduit section;

bearing means located only between said first and second pair of internal grooves between said inner conduit and said outer conduit section.

4. A swivel joint as defined in claim 3 including a dust seal between the inner conduit section and the outer conduit section at the extreme out end of said outer conduit section.

* * * * *